United States Patent
Goss et al.

(10) Patent No.: US 8,335,581 B2
(45) Date of Patent: Dec. 18, 2012

(54) FLEXIBLE JOB PREPARATION AND CONTROL

(75) Inventors: Raymond G. Goss, Austin, TX (US); Diwas Adhikari, Austin, TX (US)

(73) Assignee: Globalfoundries Inc., Grand Cayman (KY)

( * ) Notice: Subject to any disclaimer, the term of this patent is extended or adjusted under 35 U.S.C. 154(b) by 712 days.

(21) Appl. No.: 12/483,891

(22) Filed: Jun. 12, 2009

(65) Prior Publication Data

US 2010/0318209 A1    Dec. 16, 2010

(51) Int. Cl.
G06F 17/00    (2006.01)

(52) U.S. Cl. ........ 700/100; 700/108; 700/112; 700/226; 700/121; 700/149; 700/102; 700/113; 700/101; 700/96; 700/230; 414/222.01; 414/222.02; 414/281; 414/937

(58) Field of Classification Search ................... 700/100, 700/213, 228, 226, 112–115, 169, 190, 230, 700/229, 221
See application file for complete search history.

(56) References Cited

U.S. PATENT DOCUMENTS

| | | | | |
|---|---|---|---|---|
| 5,399,531 A * | 3/1995 | Wu | | 700/112 |
| 6,449,530 B1 * | 9/2002 | Yamada et al. | | 700/214 |
| 6,457,587 B1 * | 10/2002 | Conboy et al. | | 209/630 |
| 6,516,238 B1 * | 2/2003 | Kim et al. | | 700/112 |
| 6,604,010 B2 * | 8/2003 | Lyoo et al. | | 700/100 |
| 6,687,563 B1 * | 2/2004 | Wang et al. | | 700/121 |
| 6,826,441 B2 * | 11/2004 | Yamagishi | | 700/121 |
| 7,085,614 B1 * | 8/2006 | Gartland et al. | | 700/100 |
| 7,206,652 B2 * | 4/2007 | Burda et al. | | 700/96 |
| 7,487,099 B2 | 2/2009 | Gartland et al. | | |
| 2002/0094257 A1 * | 7/2002 | Babbs et al. | | 414/277 |
| 2002/0164242 A1 * | 11/2002 | Wehrung et al. | | 414/935 |
| 2003/0040841 A1 * | 2/2003 | Nasr et al. | | 700/245 |
| 2003/0083766 A1 * | 5/2003 | Lyoo et al. | | 700/100 |
| 2004/0039469 A1 * | 2/2004 | Lin | | 700/100 |
| 2004/0073331 A1 * | 4/2004 | Chang et al. | | 700/223 |
| 2004/0111339 A1 * | 6/2004 | Wehrung et al. | | 705/30 |
| 2005/0075748 A1 * | 4/2005 | Gartland et al. | | 700/108 |
| 2005/0096770 A1 * | 5/2005 | Chua et al. | | 700/102 |
| 2005/0096775 A1 * | 5/2005 | Wang et al. | | 700/112 |
| 2006/0064188 A1 * | 3/2006 | Ushiku et al. | | 700/96 |
| 2007/0168318 A1 * | 7/2007 | Burda et al. | | 707/1 |
| 2007/0244594 A1 * | 10/2007 | Chik et al. | | 700/112 |
| 2007/0276529 A1 * | 11/2007 | Brill et al. | | 700/112 |
| 2007/0282477 A1 * | 12/2007 | Schmidt | | 700/101 |
| 2008/0112787 A1 * | 5/2008 | Rebstock | | 414/749.1 |
| 2008/0183324 A1 * | 7/2008 | Krisnamuthi et al. | | 700/112 |
| 2008/0275582 A1 * | 11/2008 | Nettles et al. | | 700/100 |
| 2008/0289932 A1 * | 11/2008 | Rice et al. | | 198/465.1 |
| 2008/0299684 A1 * | 12/2008 | Rothe et al. | | 438/14 |
| 2009/0196716 A1 * | 8/2009 | Rebstock | | 414/222.01 |
| 2011/0142575 A1 * | 6/2011 | Friedman et al. | | 414/222.01 |
| 2012/0089245 A1 * | 4/2012 | Adhikari et al. | | 700/112 |
| 2012/0203367 A1 * | 8/2012 | Burda et al. | | 700/101 |

* cited by examiner

Primary Examiner — Sean Shechtman
Assistant Examiner — Olvin Lopez Alvarez
(74) Attorney, Agent, or Firm — Ditthavong Mori & Steiner, P.C.

(57) ABSTRACT

Preparation of a wafer processing or measuring tool for a job can be initiated prior to assigning a wafer carrier to deliver wafers to the tool. The automated process may include transfer of wafers from a container, such as a bare wafer stocker, or between two tools.

12 Claims, 3 Drawing Sheets ively, a carrier may be assigned to the wafer lot sub-
FLEXIBLE JOB PREPARATION AND CONTROL

TECHNICAL FIELD

The present disclosure relates to manufacturing automation systems, and more particularly to an automated method and apparatus for preparing a semiconductor tool for wafer lots and carriers.

BACKGROUND

The manufacturing of a semiconductor product typically involves a number of processing steps, or jobs, carried out on one or more pieces of processing equipment or tools. For example, the manufacture of electronic devices in a wafer fabrication facility involves the performance of processing steps such as film deposition, photolithography, etching, heat treatment, and dopant introduction with respect to a wafer substrate such as silicon. For each job, wafers must be delivered to the load port of the tool being employed, and, when multiple tools are required, the wafers must be transferred there between. Likewise, when tools are employed for measuring properties of semiconductor wafers, the wafers must be delivered to the tools.

Silicon wafer lots are generally provided to tools in carriers, such as front opening unified pods, or FOUPs. A FOUP may hold 25 wafers in a secure and safe controlled environment. Another type of carrier is a single/dual wafer transport carrier/pod, or SOUP. A FOUP, SOUP, or other type of carrier allows the wafers to be removed for processing or measurement by the tools and robotic handling systems.

Current operational scenarios in the semiconductor industry require that the FOUP (or other wafer carrier) be part of the job setup sequence. In typical scenarios, wafers to be processed or measured have been loaded in carriers prior to the job set up. However, in some cases, wafers are stored in a bare wafer stocker (BWS), or other single wafer management system, and a carrier for delivery of wafers to various job sites may not yet be identified. The latter scenario poses a challenge to perform job setup, deliver and start control jobs. Conventionally, if the wafers are stored in a BWS, the transfer of the wafers into the FOUP is not part of the automated process.

In the scenario in which the delivery FOUP or carrier is known at the outset, it is possible that the wafers have not yet been placed in the carrier at the start of the job preparation. As reservation linking the job to the tool conventionally cannot take place until the wafers are placed in the carrier, the automation process is hindered.

A need therefore exists for an improved automated wafer preparation process.

SUMMARY

An automated job preparation process may be initiated upon receipt of a wafer load request from a tool interface. In response to the request, a wafer lot is selected. A job preparation request to create a control job identifying the selected wafer lot may then be transmitted to the tool interface. The selected wafer lot may then be transferred to a carrier if such transfer was not made earlier. The carrier is then delivered to the load port of the tool for which the tool interface of the tool has already performed the job preparation to start processing.

The carrier to be used, which may be a FOUP, may be determined with the selection of the wafer lot. In that case, the job preparation request may include data identifying the carrier. The wafers may be transferred to the carrier from a BWS. Alternatively, a carrier may be assigned to the wafer lot subsequent to transmission of the job preparation, and the job preparation may be updated and transmitted to the tool interface after the wafers are transferred to the assigned carrier. The tool may be a semiconductor processing tool or measuring tool.

Apparatus used for the automated preparation process may include a bare wafer stocker; a tool interface; a tool, such as a semiconductor processing tool or measuring tool, associated with the tool interface; and a processor. The processor can receive a wafer load request from the tool interface, select a wafer lot in response to the wafer load request, transmit a job preparation identifying the selected wafer lot, initiate transfer the selected wafer lot from the BWS to a carrier, and initiate delivery of the carrier to the tool to execute the prepared job on the wafer lot.

The carrier may be a FOUP. The processor may determine and identify a FOUP for the selected wafer lot. The job preparation then comprises data identifying the FOUP. Alternatively, the processor may assign a carrier to the wafer lot subsequent to the transmission of the job preparation. In that case, the processor may then update the job preparation to include data identifying the FOUP and to transmit the updated information to the tool interface. The apparatus may further include an automated material handling system interface for moving FOUPs between a load port on the tool and a load port on another tool.

Additional aspects and technical effects of the present disclosure will become readily apparent to those skilled in the art from the following detailed description wherein embodiments of the present disclosure are described simply by way of illustration of the best mode contemplated to carry out the present disclosure. As will be realized, the present disclosure is capable of other and different embodiments, and its several details are capable of modifications in various obvious respects, all without departing from the present disclosure. Accordingly, the drawings and description are to be regarded as illustrative in nature, and not as restrictive.

BRIEF DESCRIPTION OF THE DRAWINGS

The present disclosure is illustrated by way of example, and not by way of limitation, in the figures of the accompanying drawing and in which like reference numerals refer to similar elements and in which.

DETAILED DESCRIPTION

In the following description, for the purposes of explanation, numerous specific details are set forth in order to provide a thorough understanding of exemplary embodiments. It should be apparent, however, that exemplary embodiments may be practiced without these specific details or with an equivalent arrangement. In other instances, well-known structures and devices are shown in block diagram form in order to avoid unnecessarily obscuring exemplary embodiments.

The present disclosure loosens the coupling of wafers/wafer lots, the carrier, and the control job such that semiconductor processing and/or measuring jobs can be created and prepped prior to the determination of the specific carrier to be used. Although the present disclosure may apply to several different types of carriers, the figures will be described with respect to FOUPs.

Figure 1:
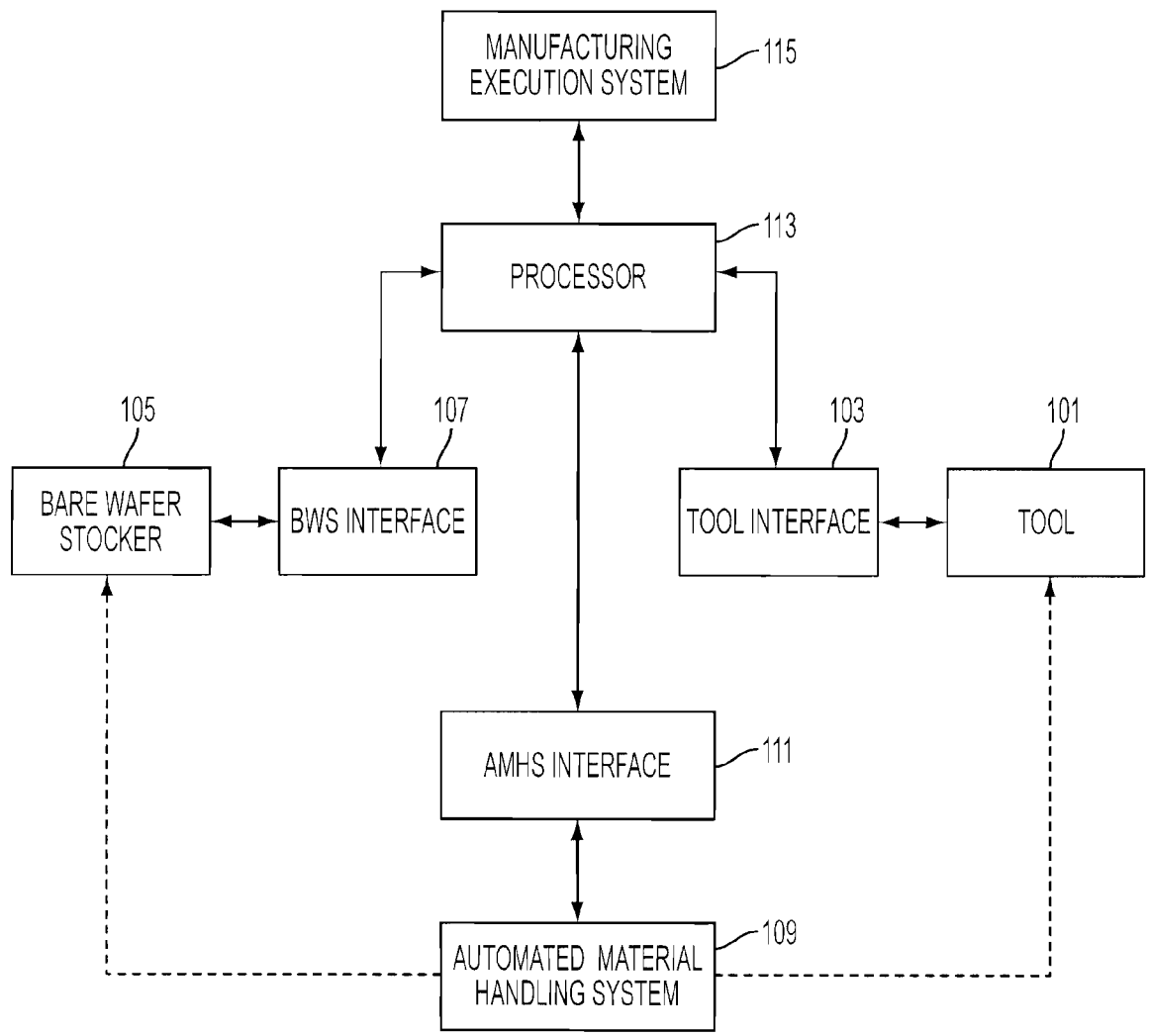
FIG. 1 schematically illustrates an apparatus for preparing a semiconductor processing or measuring job.

FIG. 1 schematically illustrates an apparatus for preparing a tool for semiconductor processing (or measuring) job. The apparatus includes the tool 101 upon which the job will be performed. The tool 101 has a tool interface 103 associated therewith. The apparatus further includes a bare wafer stocker (BWS) 105 and its associated BWS interface 107. An automated material handling system (AMHS) 109 moves wafers/wafer lots from BWS 105 into FOUPs and transfers FOUPs from the BWS 105 to a load port on tool 101 and between load ports on multiple tools. AMHS has an associated AMHS interface 111. Manufacturing Execution System (MES) 115 is central to tracking wafer flow and processing state on the production floor. All production floor entities are modeled in MES and their states are tracked in real time.

Processor 113 communicates with tool interface 103, BWS interface 107, and AMHS interface 111 throughout the job preparation. For example, processor 113 receives a load request from tool interface 103 and transmits a job preparation request to tool interface 103 once a wafer lot has been selected for the job. Further, processor 113 communicates a sort job instruction to BWS interface 107, instructing the BWS 105 to place the selected wafer lot into a FOUP when the wafers are not already in a FOUP. In addition, processor 113 communicates with AMHS interface 111 to instruct AMHS 109 to transfer the FOUP to the BWS for loading the wafers into the FOUP and to transfer the FOUP to the load port of the tool 101 once the wafers have been placed in the FOUP. Although a single tool 101 and corresponding tool interface 103 is shown for simplicity, the apparatus could include a plurality of tools and tool interfaces for performing multiple jobs associated with a semiconductor process.

Figure 2:
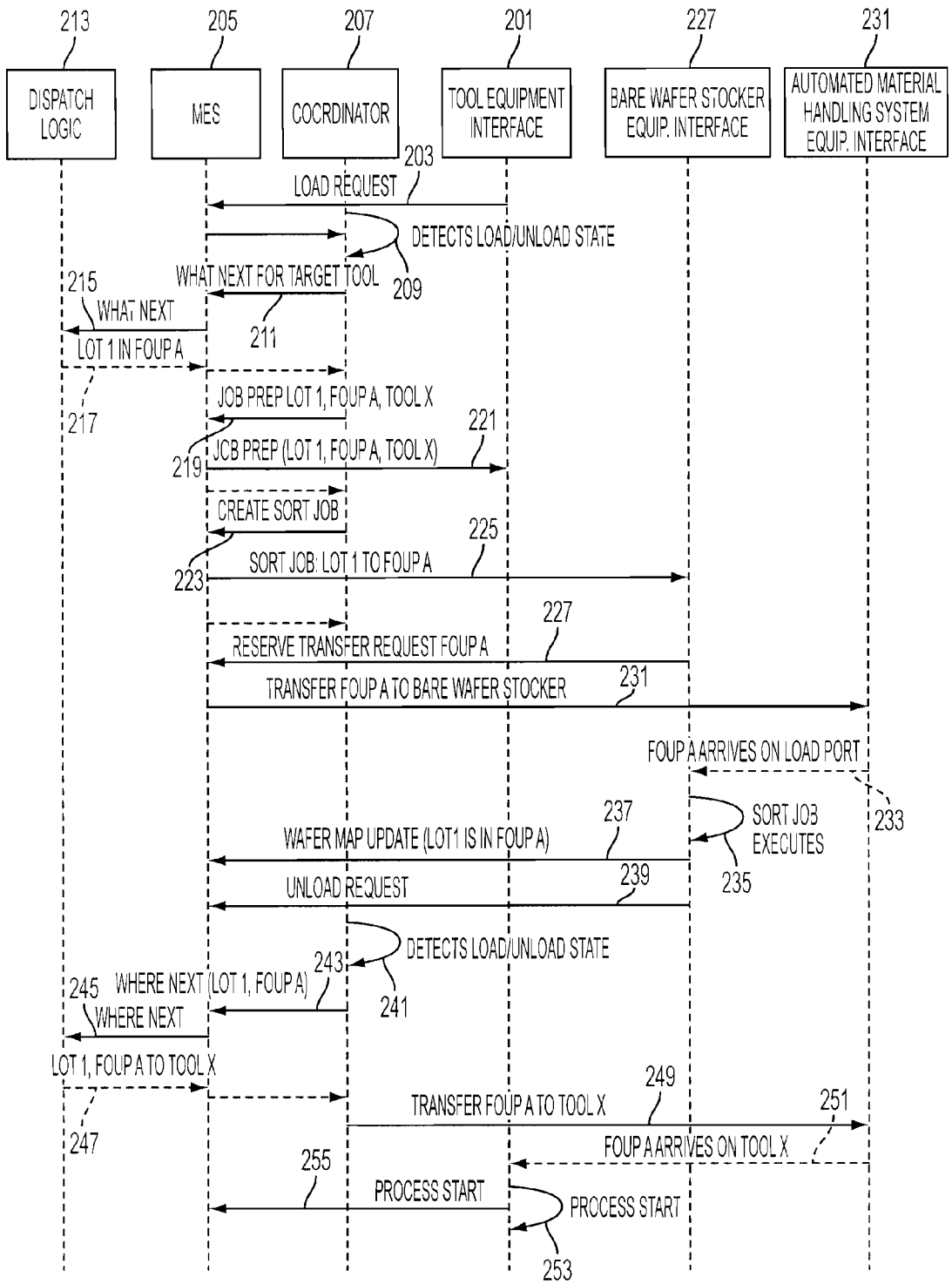
FIG. 2 illustrates an automated sequence of steps for preparing a semiconductor processing or measuring job when the FOUP is known (but wafers are not physically in the FOUP yet)

Adverting to FIG. 2, an automated sequence of steps for preparing a semiconductor job when the FOUP is known is illustrated. The sequence begins with tool equipment interface 201 transmitting a load request 203 to MES 205. The load request 203 alerts MES 205 that the tool load port is ready for a carrier of wafers. MES 205 updates the load port state it maintains internally for the tool. The coordinator 207 is configured for real time detection in changes to the load and unload state of the tool (amongst many other things) in step 209.

In step 211, coordinator 207 triggers a "What Next" analysis, querying MES 205 as to what wafer lot and carrier are the next available. MES 205 in turn queries dispatch logic 213 for the next lot and carrier at step 215. It should be noted that dispatch logic 213 reside within the realm of Manufacturing Execution System 115 on FIG. 1.

Component handling the dispatch logic 213 contains an inventory list of the lots in the facility and all required context information so that it can effectively prioritize wafer lots for processing (or measurement) on a tool. Dispatch logic 213 determines that the next available wafer lot and carrier are lot 1 in FOUP A and suggests this combination to coordinator 207, via MES 205 in step 217. Once coordinator 207 receives the selected lot and carrier information from dispatch logic 213, it transmits to the MES 205 a job preparation request identifying lot 1, FOUP A, and tool X (step 219). The MES 205 then notifies equipment interface 201 of tool X (step 221) that it will receive wafer lot 1 in FOUP A and reserves a load port for the same.

On completion of the job preparation task, coordinator 207 requests creation of a sort job request (step 223). The sort job essentially entails an indication that lot 1 needs to be placed in FOUP A. The MES 205 in turn alerts bare wafer stocker (BWS) equipment interface 227 in step 225. BWS equipment interface 227 is the same as BWS interface 107 from FIG. 1. In order for BWS to move the wafers out of the BWS and into FOUP A, FOUP A must be placed in the load port of the BWS. Thus, in response to the alert from MES 205 that lot 1 needs to be moved into FOUP A, BWS equipment interface 227 sends a reserve transfer request back to MES 205 in step 227. In step 231, MES 205 directs the automated material handling system (AMHS) equipment interface 231 to transfer FOUP A to the BWS for execution of the sort job (to move lot 1 to FOUP A). AMHS transfers FOUP A to a load port of the BWS at step 233, and the sort job executes at step 235.

Once the wafers have been moved into FOUP A, BWS equipment interface 227 sends a wafer map update (step 237) to MES 205, so that MES 205 knows that the wafers are no longer in the BWS, but rather are in FOUP A. BWS interface 227 also transmits an unload request in step 239 to MES 205.

At step 241, coordinator 207 detects the load/unload state of the BWS. Then, coordinator 207 transmits a "Where Next" inquiry to MES 205, in step 243, asking for the next destination for lot 1 and FOUP A. MES 205 forwards the inquiry to dispatch logic 213 at step 245. Dispatch logic 213 responds in step 247 to coordinator 207 (via MES 205) that lot 1 and FOUP A are ready to go to tool X. Coordinator 207, in step 249, orders AMHS equipment interface 231 to transfer FOUP A to tool X.

AMHS moves FOUP A to tool X in step 251, and tool equipment interface 201 starts the process or job with the wafers in FOUP A at step 253. Tool equipment interface 201 also notifies MES 205 at step 255 that the process has begun. By this sequence, job preparation begins prior to the movement of the wafers into a FOUP, which previously was not possible. Further, the BWS has become a part of the automated process.

Figure 3:
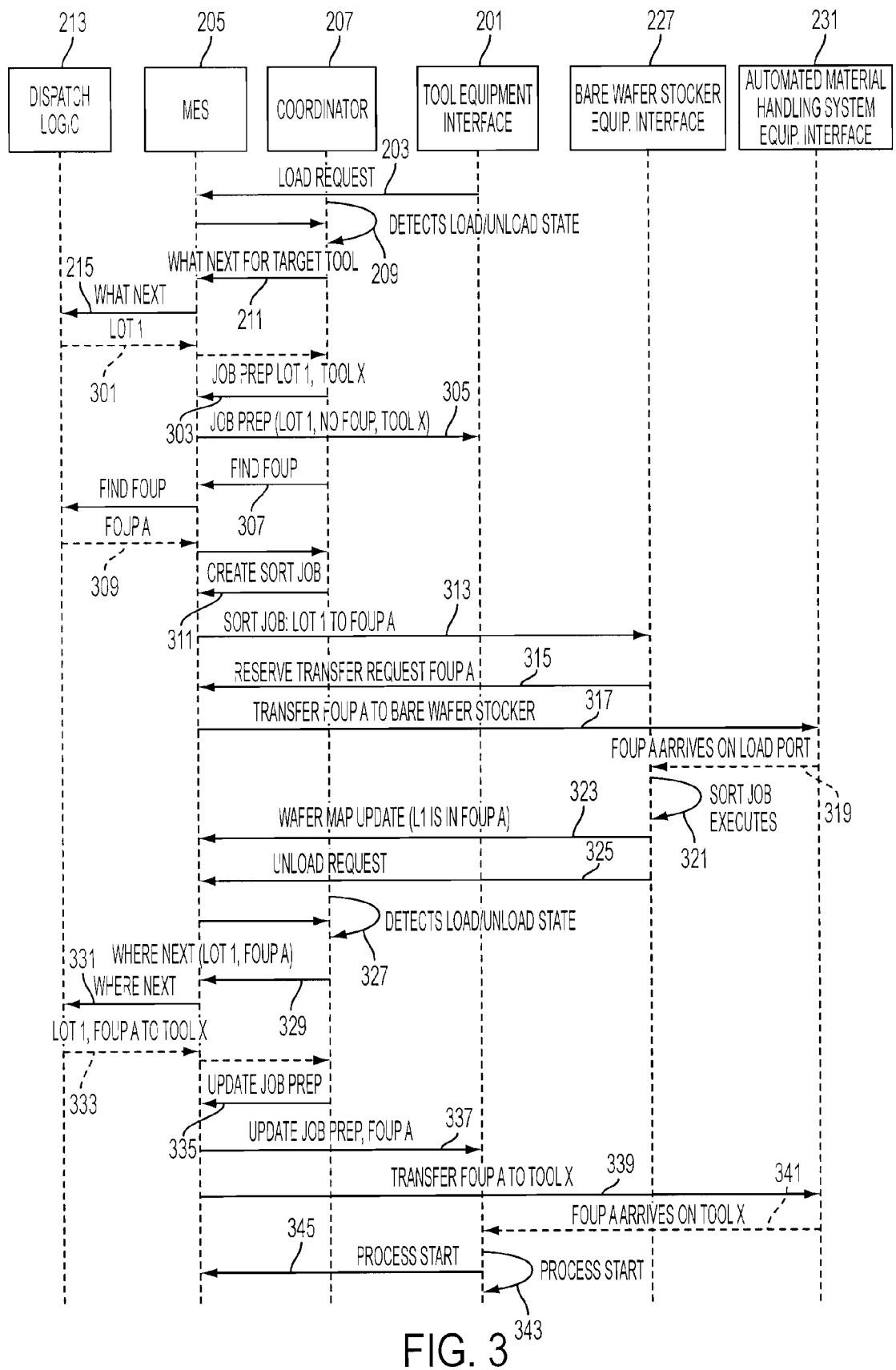
FIG. 3 illustrates an automated sequence of steps for preparing a semiconductor processing or measuring job when the FOUP is unknown at the time the job preparation request is initiated.

In the situation where the carrier is unknown when the job preparation on the tool begins, the sequence differs slightly from FIG. 2, as illustrated in FIG. 3. The sequence begins the same as when the carrier is known, i.e., with load request 203 from tool equipment interface 201, detection of the load/unload state in step 209, the "what next" queries from coordinator 207 to MES 205 (step 211) and to dispatch logic 213 (step 215). However, the response in step 301 from dispatch logic 213 to coordinator 207 (via MES 205) only identifies lot 1, with no FOUP. The job preparation notification sent by coordinator 207, to MES 205 in step 303 does not identify any FOUP. Consequently, the notification from MES 205 to tool equipment interface 201 at step 305 identifies lot 1 and tool X, but no FOUP. As a result tool X is alerted that it will receive wafer lot 1 and reserves a load port for the same, even though the carrier in which lot 1 will arrive is still unknown.

In step 307, coordinator 207, orders dispatch logic 213 (via MES 205) to find an appropriate FOUP for the selected lot. Dispatch returns at step 309 with an identification of FOUP A. Once the carrier is specified to MES 205, and the information is forwarded to coordinator 207, coordinator 207 then proceeds to create a sort job at step 311.

The sort job, as in the sequence of FIG. 2, indicates that lot 1 needs to be placed in FOUP A. Coordinator 207 discloses the sort job to MES 205 (in step 311), which alerts bare wafer stocker (BWS) equipment interface 227 in step 313. In order for BWS to move the wafers out of the BWS and into FOUP A, FOUP A must be placed in the load port of the BWS. Thus, in response to the sort job message from MES 205 that lot 1 needs to be moved into FOUP A, BWS equipment interface 227 sends a reserve transfer request back to MES 205 at step 315. In step 317, MES 205 directs the automated material handling system (AMHS) equipment interface 231 to transfer FOUP A to the BWS for execution of the sort job (to move lot 1 to FOUP A). AMHS transfers FOUP A to a load port of the BWS at step 319, and the sort job executes at step 321.

Once the wafers have been moved into FOUP A, BWS equipment interface 227 sends a wafer map update (step 323) to MES 205, so that MES 205 knows that the wafers are no longer in the BWS, but rather are in FOUP A. BWS interface 227 also transmits an unload request in step 325 to MES 205.

At step 327, coordinator 207 detects the load/unload state of the BWS. Then, coordinator 207 transmits a "Where Next" inquiry to MES 205, in step 329, asking where lot 1 and FOUP A go next. MES 205 forwards the inquiry to dispatch logic 213 at step 331. Dispatch logic 213 responds in step 333 to MES 205 that lot 1 and FOUP A are ready to go to tool X (this gets forwarded to the coordinator 207).

At this point, coordinator 207 transmits at step 335 an update job preparation message to MES 205, which in turn sends a corresponding update job preparation message to tool equipment interface 201 at step 337. It should be noted that the update job preparation steps may occur any time after the carrier, or FOUP, is determined, but prior to instructions to transfer the FOUP to the tool.

Once the job preparation is updated, at step 339, MES 205 instructs AMHS equipment interface that FOUP A needs to be transferred to tool X. AMHS moves FOUP A to the tool at step 341. The process, or job, may then begin at 343, and a message to that effect is sent to MES 205 at step 345. As indicated by the sequence of FIG. 3, the preparation for using the tool can proceed before a carrier is specified for the wafer lot to be acted upon by the tool, and the transfer of wafers from BWS is incorporated into the automated process.

Embodiments of the present disclosure can achieve several technical effects, including starting preparation of a tool prior to knowing the carrier that will be used and including transfer from the BWS as part of the automated process, thereby improving wafer yield and reducing cycle time. The present disclosure enjoys industrial applicability in semiconductor processing and measuring and potentially in any field with products that have optimized storage outside carriers or FOUPs, such as liquid crystal display panels.

In the preceding description, the present disclosure is described with reference to specifically exemplary embodiments thereof. It will, however, be evident that various modifications and changes may be made thereto without departing from the broader spirit and scope of the present disclosure, as set forth in the claims. The specification and drawings are, accordingly, to be regarded as illustrative and not as restrictive. It is understood that the present disclosure is capable of using various other combinations and embodiments and is capable of any changes or modifications within the scope of the inventive concept as expressed herein.

What is claimed is:

1. An automated method comprising:
   receiving a wafer load request from a tool interface;
   selecting a wafer lot not yet in a carrier in response to the wafer load request;
   transmitting a job preparation identifying the selected wafer lot to the tool interface without specifying a carrier;
   assigning a carrier to the selected wafer lot subsequent to transmitting the job preparation;
   transferring the selected wafer lot from a bare wafer stocker (BWS) to the assigned carrier;
   delivering the carrier to a tool associated with the tool interface; and
   applying the tool to the wafer lot.

2. The method according to claim 1, wherein the carrier comprises a front opening unified pod (FOUP).

3. The method according to claim 1, wherein the carrier comprises a single or dual wafer transport carrier or pod (SOUP).

4. The method according to claim 1, further comprising:
   updating the job preparation after transferring the wafer lot to the assigned carrier.

5. The method according to claim 4, further comprising:
   transmitting the updated job preparation to the tool interface.

6. An apparatus comprising:
   a bare wafer stocker (BWS);
   a tool interface;
   a tool associated with the tool interface; and
   a processor configured to:
      receive a wafer load request from the tool interface;
      select a wafer lot not yet in a carrier in response to the wafer load request;
      transmit a job preparation identifying the selected wafer lot without specifying a carrier;
      assign a carrier to the selected wafer lot subsequent to transmitting the job preparation;
      transfer the selected wafer lot from the BWS to the assigned carrier;
      deliver the carrier to the tool; and
      apply the tool to the wafer lot.

7. The apparatus according to claim 6, wherein the carrier comprises a FOUP.

8. The apparatus according to claim 7, further comprising an automated material handling system interface for moving FOUPs between a load port on the tool and a load port on another tool.

9. The apparatus according to claim 6, wherein the carrier comprises a SOUP.

10. The apparatus according to claim 6, the processor further configured to update the job preparation after transferring the wafer lot to the assigned carrier.

11. The apparatus according to claim 10, the processor further configured to transmit the updated job preparation to the tool interface.

12. An automated method comprising:
   receiving a wafer load request from a tool interface;
   selecting a wafer lot not yet in a FOUP in response to the wafer load request;
   transmitting a job preparation identifying the selected wafer lot to the tool interface without specifying a FOUP;
   assigning a FOUP to the wafer lot;
   transferring the wafer lot from a bare wafer stocker (BWS) to the assigned FOUP;
   updating the job preparation to identify the assigned FOUP;
   delivering the FOUP to a semiconductor processing tool associated with the tool interface; and
   performing the semiconductor process on the wafer lot using the semiconductor processing tool.

* * * * *